United States Patent
Bayar et al.

(10) Patent No.: US 11,863,674 B2
(45) Date of Patent: Jan. 2, 2024

(54) DLP APPLIANCE AND METHOD FOR PROTECTING DATA SOURCES USED IN DATA MATCHING

(71) Applicant: Zscaler, Inc., San Jose, CA (US)

(72) Inventors: Balakrishna Bayar, Bengaluru (IN); Arun Bhallamudi, Fremont, CA (US); Srikanth Devarajan, San Jose, CA (US); Siva Udupa, San Jose, CA (US); Pooja Deshmukh, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 386 days.

(21) Appl. No.: 17/132,499

(22) Filed: Dec. 23, 2020

(65) Prior Publication Data

US 2021/0119798 A1  Apr. 22, 2021

Related U.S. Application Data

(63) Continuation of application No. 15/790,513, filed on Oct. 23, 2017, now Pat. No. 10,911,233.

(30) Foreign Application Priority Data

Sep. 11, 2017  (IN) .............................. 201711032008

(51) Int. Cl.
*G06F 7/04* (2006.01)
*H04L 9/32* (2006.01)
(Continued)

(52) U.S. Cl.
CPC .......... *H04L 9/3213* (2013.01); *G06F 21/552* (2013.01); *G06F 21/6218* (2013.01);
(Continued)

(58) Field of Classification Search
CPC . H04L 9/3213; H04L 9/3247; H04L 63/0428; H04L 63/1416; H04L 63/30;
(Continued)

(56) References Cited

U.S. PATENT DOCUMENTS 8,495,705 B1 * 7/2013 Verma .................... G06Q 10/06 726/16
9,118,685 B1 * 8/2015 Brocco ............... G06F 21/6218
(Continued)

OTHER PUBLICATIONS

Shu et al, Privacy-Preserving Detection of Sensitive Data Exposure, IEEE, Feb. 10, 2015, pp. 1092-1103. (Year: 2015).*
(Continued)

*Primary Examiner* — Philip J Chea
*Assistant Examiner* — Jenise E Jackson
(74) *Attorney, Agent, or Firm* — Baratta Law PLLC; Lawrence A. Baratta, Jr.; Ryan Odessa

(57) ABSTRACT

Systems and methods of Exact Data Matching (EDM) for identifying related tokens in data content using structured signature data implemented in a cloud-based system receiving data sets and customer configuration from a customer, wherein the data sets include customer specific sensitive data from a structured data source with each token represented by a hash value and the customer configuration includes one or more primary keys for a plurality of records in the data sets; distributing the data sets and the customer configuration to a plurality of nodes in the cloud-based system; performing monitoring of content between a client of the customer and an external network; detecting a presence of a plurality of tokens associated with a record in the customer specific sensitive data based on the monitoring; and performing a policy-based action in the cloud-based system based on the detecting.

19 Claims, 8 Drawing Sheets

(51) Int. Cl.
| | |
|---|---|
| *H04L 9/40* | (2022.01) |
| *G06F 21/64* | (2013.01) |
| *G06F 21/62* | (2013.01) |
| *H04W 12/02* | (2009.01) |
| *G06F 21/55* | (2013.01) |
| *H04W 12/80* | (2021.01) |
| *G06F 40/284* | (2020.01) |

(52) U.S. Cl.
CPC .......... *G06F 21/6263* (2013.01); *G06F 21/64* (2013.01); *G06F 40/284* (2020.01); *H04L 9/3247* (2013.01); *H04L 63/0428* (2013.01); *H04L 63/1416* (2013.01); *H04L 63/30* (2013.01); *H04W 12/02* (2013.01); *H04W 12/80* (2021.01)

(58) Field of Classification Search
CPC . H04L 63/1408; H04L 9/0643; H04L 9/3236; H04L 63/04; G06F 40/284; G06F 21/552; G06F 21/6263; G06F 21/64; H04W 12/80; H04W 12/02
See application file for complete search history.

(56) References Cited

U.S. PATENT DOCUMENTS

| | | | | |
|---|---|---|---|---|
| 9,842,315 | B1* | 12/2017 | Raman | ................. G06Q 10/107 |
| 9,959,420 | B2* | 5/2018 | Kiang | ................. G06F 21/552 |
| 10,158,639 | B1* | 12/2018 | Goben | ................. H04L 63/10 |
| 10,412,102 | B1* | 9/2019 | Fridman | ............... G06F 16/901 |
| 10,498,748 | B1* | 12/2019 | Fridman | ............. H04L 63/1408 |
| 2011/0282908 | A1 | 11/2011 | Fly et al. | |
| 2012/0222110 | A1* | 8/2012 | Huang | ................ H04L 63/1408 726/22 |
| 2013/0246377 | A1 | 9/2013 | Gaitonde | |
| 2014/0237537 | A1* | 8/2014 | Manmohan | ......... G06F 21/6209 726/1 |
| 2015/0254577 | A1 | 9/2015 | Sullivan | |
| 2016/0036833 | A1* | 2/2016 | Ardeli | ................... H04L 63/101 726/22 |
| 2016/0277368 | A1* | 9/2016 | Narayanaswamy | ........................ G06F 21/6209 |
| 2016/0315930 | A1* | 10/2016 | Kim | ...................... G06F 21/41 |
| 2018/0115586 | A1* | 4/2018 | Chou | ..................... G06F 8/656 |

OTHER PUBLICATIONS

Gupta et al, A Secure and Searchable Data Storage in Cloud Computing, IEEE, Feb. 23, 2013, pp. 106-109. (Year: 2013).*

Paul et al., "Tokenization Based Service Model for Cloud Computing Environment", Aug. 27, 2016, IEEE, pp. 1-7.

Sumalatha et al., "Towards Secure Audit Services for Outsourced Data in Cloud", Apr. 12, 2014, IEEE, pp. 1-6.

Lin et al., "Design and Implementation of Multi-User Secure indices For Encryted Cloud Storgae", Jul. 12, 2013. IEEE, pp. 1-8.

* cited by examiner

EMPLOYEE RECORDS

| RECORD # | FIRST NAME | LAST NAME | CREDIT CARD NUMBER | SSN NUMBER | STREET ADDRESS | CITY | ZIP CODE |
|---|---|---|---|---|---|---|---|
| 1 | Quan | Chi | 1111111111111111 | 111-22-3333 | 3400 Main | Burbank | 91505 |
| 2 | Shang | Tsung | 2222222222222222 | 222-33-4444 | 3400 Main | Burbank | 91505 |
| 3 | Johnny | Cage | 3333333333333333 | 333-44-5555 | 3400 Main | Burbank | 91505 |
| 4 | Sonya | Blade | 4444444444444444 | 444-55-6666 | 3400 Main | Burbank | 91505 |
| 5 | Kung | Lao | 5555555555555555 | 555-66-7777 | 3400 Main | Burbank | 91505 |
| 6 | Cassie | Cage | 6666666666666666 | 666-77-8888 | 3400 Main | Burbank | 91505 |

OUTBOUND EMAIL

Hey John,

Do you think Johnny Cage debuted as one of the series' original seven characters? Pull his record with ID 333-44-5555. Send me the details on his winning stats. Let's see if he can be a good choice as an opponent for tomorrow's match.

-----

Regards,
Ed

FIG. 4

DLP APPLIANCE AND METHOD FOR PROTECTING DATA SOURCES USED IN DATA MATCHING

CROSS-REFERENCE TO RELATED APPLICATION(S)

The present disclosure is a continuation of U.S. patent application Ser. No. 15/790,513, entitled "IDENTIFICATION OF RELATED TOKENS IN A BYTE STREAM USING STRUCTURED SIGNATURE DATA," filed Oct. 23, 2017, the contents of which are incorporated by reference herein.

FIELD OF THE DISCLOSURE

The present disclosure generally relates to computer and network security systems and methods. More particularly, the present disclosure relates to systems and methods for identification of related tokens in a byte stream using structured signature data, such as for Data Leakage Prevention, content classification, etc.

BACKGROUND OF THE DISCLOSURE

With the proliferation of devices (e.g., Bring Your Own Device (BYOD)), cloud services, and the like, there is a need for enterprises to monitor content for so-called Data Loss/Leakage Prevention (DLP). Specifically, data loss or data leakage is where sensitive information is removed from the confines of an enterprise's control, such as via email, file sharing, file transfers, etc. Security breaches have become commonplace, and there is a need to prevent such data loss. Of note, data loss can also be inadvertent through careless or misinformed employees or the like.

Data is classified as structured or unstructured. Structured data resides in fixed fields within a file such as a spreadsheet or in relational databases, while unstructured data refers to free-form text or media as in text documents, PDF files, and video. An estimated 80% of all data is unstructured and 20% structured according to Burke, "Information Protection and Control survey: Data Loss Prevention and Encryption trends," IDC, May 2008. Data classification is divided into content analysis, focused on structured data and contextual analysis which looks at the place of origin or the application or system that generated the data. Methods for describing sensitive content exist. They can be divided into precise and imprecise methods. Precise methods involve content registration and trigger almost zero false positive incidents. All other methods are imprecise and can include: keywords, lexicons, regular expressions, extended regular expressions, meta data tags, Bayesian analysis and statistical analysis techniques such as Machine Learning, etc.

With the continued focus on the value of data, the move to the cloud, etc., there is a need for an efficient and precise approach to detect sensitive data. The problem statement can be summarized as: given a stream of bytes and structured signature data generated from multiple relational data sources, an approach must identify related tokens that exist in one record of a data source. Of note, existing DLP solutions can detect categories of data, e.g., XXX-XXX-XXXX where X is a number can be flagged as a social security number, and similarly for other categories of data (e.g., credit card numbers, etc.). However, there is a need to detect exact matches of data, e.g., exact social security numbers, credit card numbers, etc.

BRIEF SUMMARY OF THE DISCLOSURE

In an exemplary embodiment, a method of Exact Data Matching (EDM) for identifying related tokens in data content using structured signature data implemented in a cloud-based system includes receiving data sets and customer configuration from a customer, wherein the data sets comprise customer specific sensitive data from a structured data source with each token represented by a hash value and the customer configuration includes one or more primary keys for a plurality of records in the data sets; distributing the data sets and the customer configuration to a plurality of nodes in the cloud-based system; performing monitoring of content between a client of the customer and an external network; detecting a presence of a plurality of tokens associated with a record in the customer specific sensitive data based on the monitoring; and performing a policy-based action in the cloud-based system based on the detecting. The customer specific sensitive data can be received with the tokens represented by the hash value such that the tokens are formed by a one-way hash preventing recreation of the customer specific sensitive data therefrom. The data sets and the customer configuration can be provided from an Advanced Data Protection (ADP) appliance operated by the customer and under the customer's control. The cloud-based system can be a multi-tenant system supporting a plurality of customers comprising the customer, and wherein the distributing can include distributing the data sets and the customer configuration for each of the plurality of customers together.

The tokens can include one of a plurality of tokens types and a tokenizer operated during the detecting can be configured to characterize each token in the data content based on a delimiter and associated rules. The plurality of tokens types can include a word token, a number token, an alphanumeric token, and an email token. The tokenizer can perform a plurality of optimizations while scanning the data content to optimized scanning of subsequent tokens. The tokenizer can be configured look back at characters when determining the alphanumeric token. The detecting can utilize a token window of size N and a target hit window which stores tokens detected as the one or more primary keys, wherein the detecting can include looking back through the token window upon detection of the one or more primary keys to check for associated tokens from a record of the one or more primary keys.

In another exemplary embodiment, a cloud node in a cloud-based system configured to perform Exact Data Matching (EDM) for identifying related tokens in data content using structured signature data includes a network interface; a processor communicatively coupled to the network interface; and memory storing instructions that, when executed, cause the processor to: receive data sets and customer configuration from a customer, wherein the data sets comprise customer specific sensitive data from a structured data source with each token represented by a hash value and the customer configuration comprises one or more primary keys for a plurality of records in the data sets; distribute the data sets and the customer configuration to a plurality of nodes in the cloud-based system; perform monitoring of content between a client of the customer and an external network; detect a presence of a plurality of tokens associated with a record in the customer specific sensitive data based on the monitoring; and perform a policy-based action in the cloud-based system based on detection of the plurality of tokens. The customer specific sensitive data can be received with the tokens represented by the hash value such that the tokens are formed by a one-way hash preventing recreation of the customer specific sensitive data therefrom. The data sets and the customer configuration can be provided from an Advanced Data Protection (ADP) appliance operated by the customer and under the customer's control. The cloud-based system can be a multi-tenant system supporting a plurality of customers comprising the customer, and wherein the data sets can be distributed by distribution of the data sets and the customer configuration for each of the plurality of customers together.

The tokens can include one of a plurality of tokens types and a tokenizer operated while the presence is detected is configured to characterize each token in the data content based on a delimiter and associated rules. The plurality of tokens types can include a word token, a number token, an alphanumeric token, and an email token. The tokenizer can perform a plurality of optimizations while scanning the data content to optimized scanning of subsequent tokens. The tokenizer can be configured look back at characters when determining the alphanumeric token. The detection of the presence can utilize a token window of size N and a target hit window which stores tokens detected as the one or more primary keys, wherein the detection of the presence can include looking back through the token window upon detection of the one or more primary keys to check for associated tokens from a record of the one or more primary keys.

In a further exemplary embodiment, an Advanced Data Protection (ADP) appliance operated by a customer of a cloud-based system and configured to provide data sets for Exact Data Matching (EDM) for identifying related tokens in data content using structured signature includes a network interface; a processor communicatively coupled to the network interface; and memory storing instructions that, when executed, cause the processor to: define a customer configuration comprising one or more primary keys for a plurality of records in data sets; process the data sets comprising customer specific sensitive data from a structured data source to provide a hash value for each token; provide the customer configuration and the processed data sets to the cloud-based system for EDM monitoring therein of clients associated with the customer; and, responsive to detection of a presence of a plurality of tokens associated with a record in the customer specific sensitive data and a policy-based action based thereon in the cloud-based system, receive a notification of the detection. The customer specific sensitive data can be provided with the tokens represented by the hash value such that the tokens are formed by a one-way hash preventing recreation of the customer specific sensitive data therefrom.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a mobile device, which may be used in the cloud-based system of FIG. 1 or the like;

FIG. 4 is a diagram of an example of Exact Data Matching (EDM) with a structured data source and an associated example email message;

DETAILED DESCRIPTION OF THE DISCLOSURE

Again, in various exemplary embodiments, the present disclosure relates to systems and methods for identification of related tokens in a byte stream using structured signature data, such as for DLP, content classification, etc. The systems and methods provide an Exact Data Matching (EDM) approach with the ability to identify a record from a structured data source that matches predefined criterion. The systems and methods utilize structured data to define content for detection and, in a stream of bytes, the systems and methods identify related tokens that constitute one record of a relational data source and are within a certain distance from each other in the data stream. The systems and methods generate structured signature data from relational data sources and generate a lookup table (LUT) using one or more columns of every data source as indexes. By reference to EDM, the systems and methods enable operators to detect specific data content as opposed to generalized categories.

Using an index table and hashed signature data, the systems and methods identify the set of tokens in a byte stream that correlate to one record of a data source. The systems and methods can also identify partial matches, i.e., the set of tokens in the byte stream that constitute some or any columns of a relational data source. The systems and methods use structured signature data generated from the relational data sources. Only the signature data is used thereafter, and the original data cannot be recreated from the signature data, so the signature data can be safely ported to an unsecured location.

The systems and methods contemplate cloud-based operation in an exemplary embodiment. The systems and methods can read a large amount of customer-specific sensitive data (e.g., Personally Identifiable Information (PII), names, account numbers, etc.) securely. The systems and methods generate and store signatures of this data which are in an efficient format for distribution (e.g., in the cloud), enable fast matching, and provide security as the content is not obtainable from the signature. With this approach, the systems and methods can distribute the optimized signatures across various enforcement nodes in a cloud based system for detecting signatures in data streams processed at the enforcement node. Upon detection, the systems and methods can prescribe a policy based action such as allow, block, notify, quarantine, etc.

Exemplary Cloud System Architecture

Figure 1:
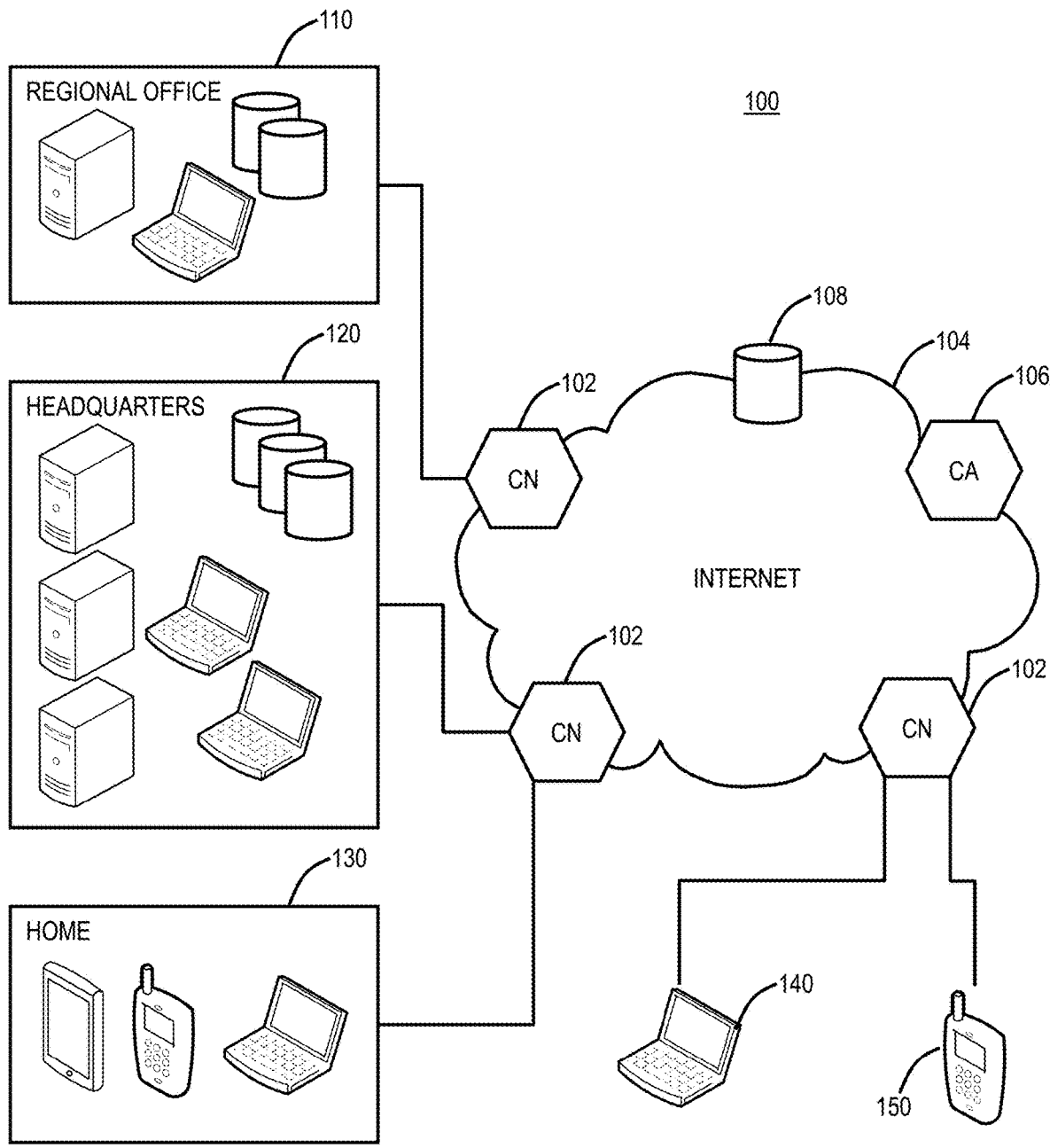
FIG. 1 is a network diagram of a cloud-based system for implementing various cloud-based service functions.
Figure 2:
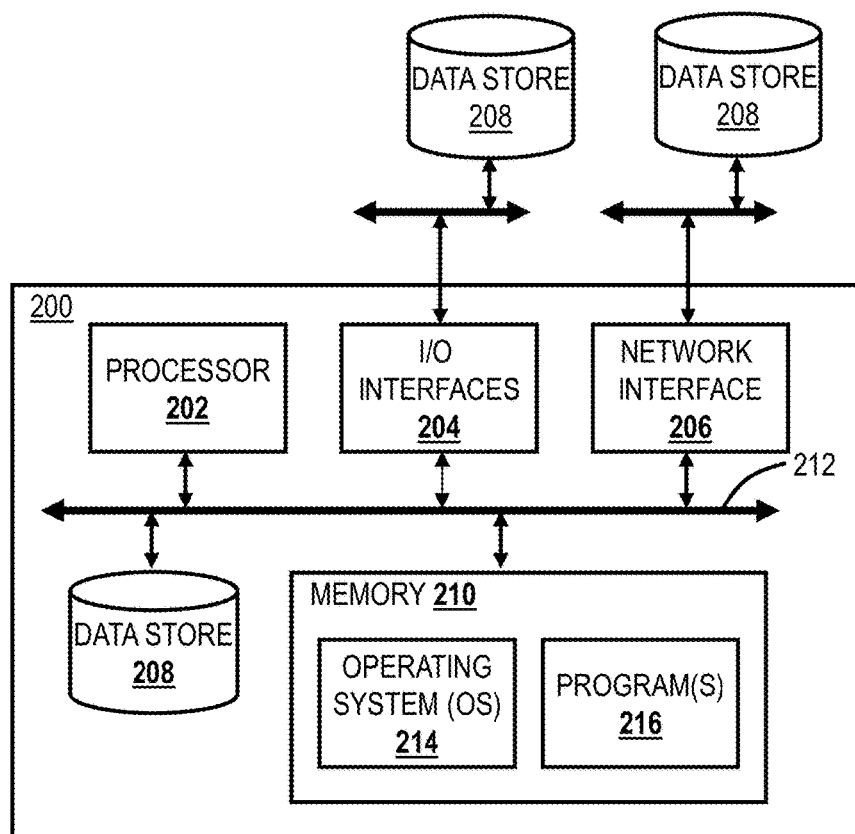
FIG. 2 is a block diagram of a server which may be used in the cloud-based system of FIG. 1, in other systems, or stand-alone.

Referring to FIG. 1, in an exemplary embodiment, a network diagram illustrates a cloud-based system 100 for implementing various cloud-based service functions. The cloud-based system 100 includes one or more cloud nodes (CN) 102 communicatively coupled to the Internet 104 or the like. Also, the cloud-based system 100 can also include one or more central authorities (CA) 106 and one or more log nodes 108, and each of the components 102, 106, 108 can be communicatively coupled to one another via the Internet 104. The cloud nodes 102, the central authorities 106, and the log nodes 108 may be implemented as a server 200 (as illustrated in FIG. 2), or the like, and can be geographically diverse from one another such as located at various data centers around the country or globe. For illustration purposes, the cloud-based system 100 can connect to a regional office 110, headquarters 120, various employee's homes 130, laptops/desktops 140, and mobile devices 150 each of which can be communicatively coupled to one of the cloud nodes 102 via the Internet 104. These locations 110, 120, 130 and devices 140, 150 are shown for illustrative purposes, and those skilled in the art will recognize there are various access scenarios to the cloud-based system 100 all of which are contemplated herein.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one exemplary embodiment of a cloud-based system, and those of ordinary skill in the art will recognize the systems and methods described herein contemplate operation with any cloud-based system.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

In an exemplary embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an exemplary embodiment, the cloud-based system 100 may be viewed as Security-as-a-Service through the cloud, such as the IA.

Figure 3:
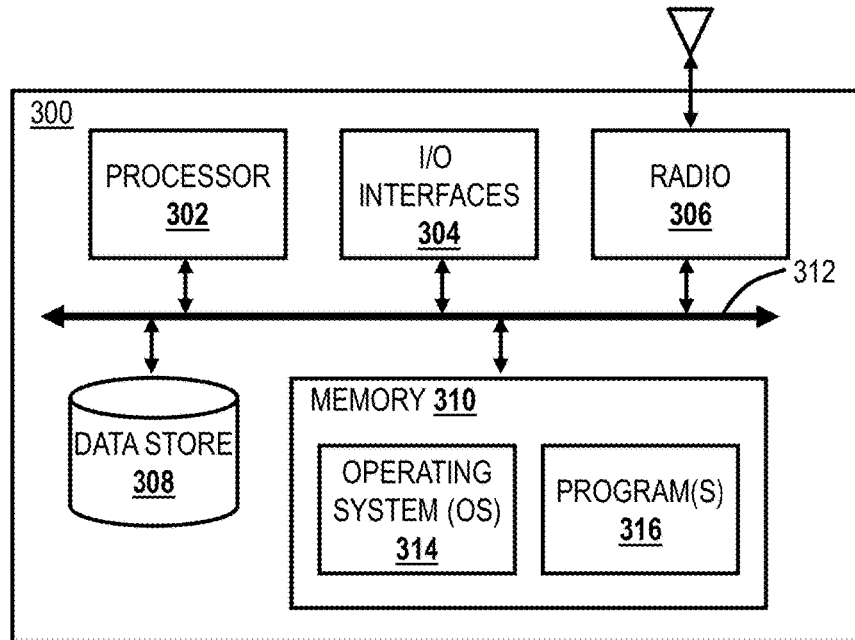

In an exemplary embodiment, the cloud-based system 100 can be configured to provide mobile device security and policy systems and methods. The mobile device 150 may be a server 200 (as illustrated in FIG. 3) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

As a cloud-based security system, the cloud-based system 100 has a distributed network, multi-tenant architecture. The cloud-based system 10 is configured to examine traffic over all ports and protocols including SSL encrypted traffic. The policies are configured to follow the user, regardless of their location or device. The cloud-based system 100 can provide security functionality combining findings from various different approaches to deliver a holistic perspective. The cloud-based system 100 can be capable of recognizing threats independent of signature feeds, and the cloud-based system 100 can propagate threat information across the cloud in real-time, i.e., zero-day or zero-hour determinations such as between the cloud nodes 102 and the central authority 102.

The objective of the cloud-based system as a cloud-based security system is a multi-tenant (multiple users, companies, etc. on the same platform) and highly scalable system through functionally distributes components of a standard proxy to create a giant global network that acts as a single virtual proxy. The user can go to any gateway (cloud node 102) at any time for policy-based secure Internet access. Two exemplary services for the cloud-based system 100 can include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), Data Leakage Prevention (DLP), and the like. The PA can include access control, micro service segmentation, etc. For example, the IA service can provide a user with Internet Access and the PA service can provide a user with access to enterprise resources in lieu of traditional Virtual Private Networks (VPNs).

The central authority 106 is a supervisory management node, i.e., the "brains" of the cloud-based security system. The central authority 106 manages and monitors all cloud nodes 102 and ensures that they are always up-to-date with the latest real-time feeds and software and that they are synchronized to propagate threat intelligence cloud-wide. The central authority 106 directs users to the closest cloud node 102, ensuring that policy follows the user with minimum latency. The central authorities 106 are a globally distributed peer-to-peer cluster with an automatically elected master. This ensures all cloud components can always talk to a central authority 106 even if there are major Internet 104 outages that isolate an entire region. Through its multi-tenant architecture, the central authority 106 provides each organization with its own secure portal to administer policy. Any change to the policy is communicated to the cloud nodes 102 within seconds. The central authority 106 provides an end-user authentication framework through integration with Secure Lightweight Directory Access Protocol (LDAP) or ID Federation systems.

The cloud nodes 102 are configured to interface traffic with the users, e.g., the locations 110, 120, 130 and devices 140, 150. The cloud nodes 102 are configured to perform security, management, and compliance policies for the users, with the policies served by the central authority 106. The cloud nodes 102 can be an inline proxy that enforces policies on a user-level granularity. The cloud nodes 102 can scan every byte of a request, content, responses, and all related data for inline blocking of threats like viruses, cross site scripting (XSS), and botnets. This capability also enables Dynamic Content Classification (DCC) of unknown sites. By scanning each page, the cloud nodes 102 can determine a risk index for every page loaded that enables administrators to control content served to their users based on acceptable risk. The cloud nodes 102 can include authentication and policy distribution mechanisms that enables any user to connect to any cloud node 102 at any time enabling enterprises to simply point traffic to any cloud node 102 to ensure full policy enforcement while getting all reports back in real-time.

The log nodes 108 can be integrated with the cloud nodes 102 or separate. The log nodes 108 are configured to maintain logs of all user transactions, in a compressed manner. The logs can be transmitted every second to the log nodes 108 over secure connections from the cloud nodes 102, as well as multicast to multiple servers for redundancy. The log nodes 108 provide an administrator with real-time reports and the capability to query complete transaction-level details for any user, department, or location at any time in seconds. Data privacy and security are fundamental to any multi-tenant architecture. The cloud-based security system can provide privacy protection at a transaction level by avoiding any storage of transaction content. For example, transaction content is never written to disk but takes place in memory. The log nodes 108 can store and transfer logs in an encrypted format, Exemplary Server Architecture Referring to FIG. 2, in an exemplary embodiment, a block diagram illustrates a server 200 which may be used in the cloud-based system 100, in other systems, or standalone. For example, the cloud nodes 102, the central authority 106, and/or the log nodes 108 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Referring to FIG. 3, in an exemplary embodiment, a block diagram illustrates a mobile device 300, which may be used in the cloud-based system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

Exact Data Matching

Referring to FIG. 4, in an exemplary embodiment, a diagram illustrates an example of exact data matching with a structured data source 400 and an associated example email message 402. Exact Data Matching (EDM) is the ability to identify a record from the structured data source 400 (or any other structured data source) that matches a predefined criterion. Enterprises (e.g., health care providers, banks, etc.) want to protect PII from being lost (i.e., transmitted outside of the enterprise's network). Thus, an aspect of EDM is the ability to identify and correlate multiple tokens which contribute to a single data record. For example, the email message 402 includes three specific tokens from record number 3 in the structured data source 400. It is an objective of an EDM system, through the cloud system 100, to identify this record in data streams from users.

Figure 5:
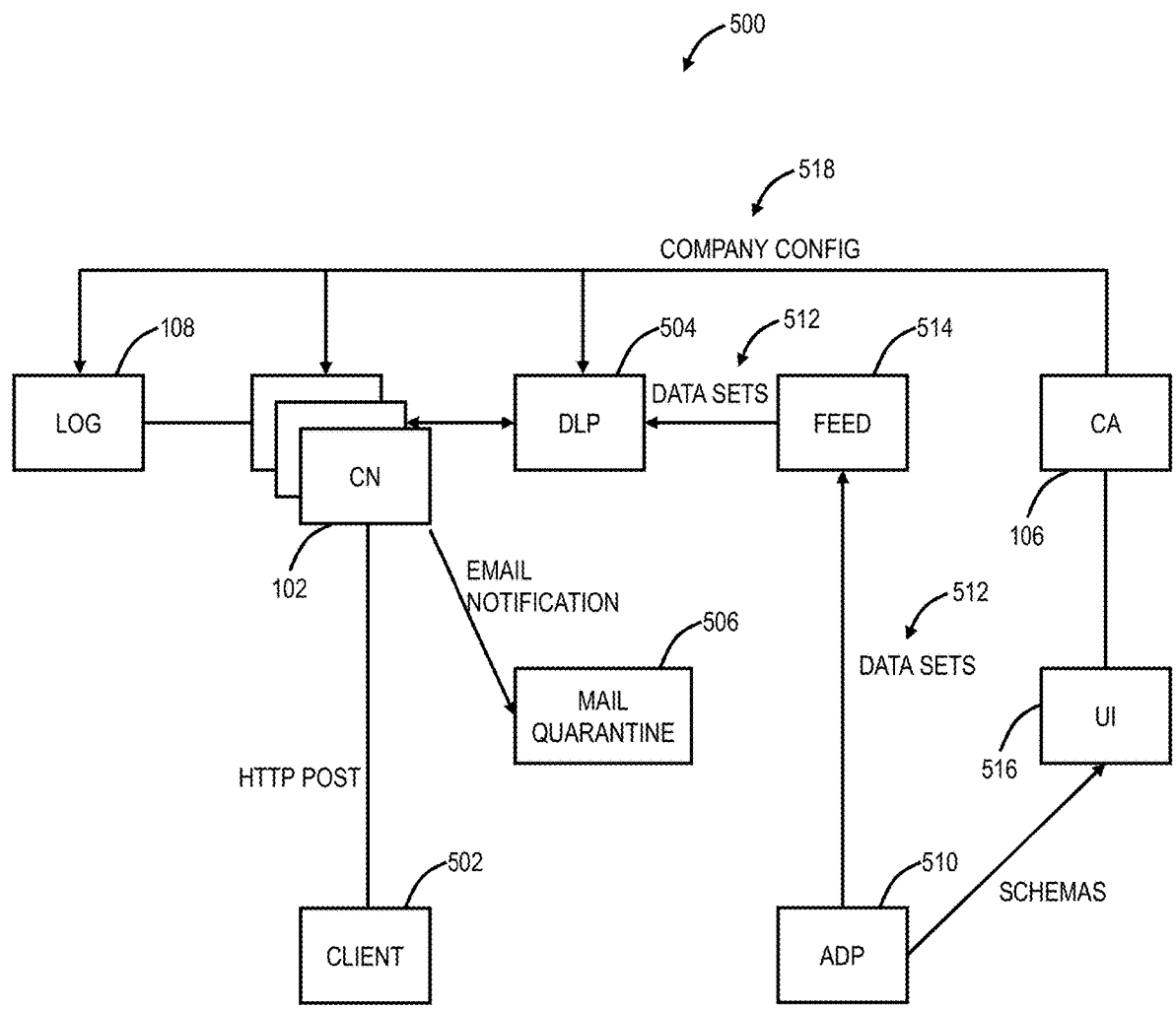
FIG. 5 is a network diagram of an EDM system implemented through the cloud-based system of FIG. 1.

Referring to FIG. 5, in an exemplary embodiment, a network diagram illustrates an EDM system 500 implemented through the cloud-based system 100. The EDM system includes one or more clients 502 (e.g., the locations 110, 120, 130 and/or the devices 140, 150) connected to the Internet via the cloud nodes 102. The cloud nodes 102 connect to the central authority 106, the log node 108, a DLP processing engine 504, and a mail/quarantine server 506, and these components can be viewed as a data plane which processes EDM for DLP on data to/from the clients 502. A control plane in addition to the data plane can provide data sets and configuration of the DLP processing engine 504. An Advanced Data Protection (ADP) virtual appliance 510 can be accessed by the enterprise IT administrators for defining the EDM. The ADP virtual appliance 510 enables data sets 512 to be provided via a central feed distribution server 514 from the enterprise, and a user interface 516 allows the enterprise IT administrators to define a company configuration 518 which is provided to the DLP processing engine 504 and the cloud nodes 102 via the central authority 106. Also, the log node 108 is connected to the central authority 106 for configuration and log display.

The control plane is used to deliver data sets and configuration to the DLP processing engine 504. Specifically, an administrator provides requirements via the ADP virtual appliance 510, such as via a command line tool, the user interface 516, an EDM client which connects via an Application Programming Interface (API), etc. Once the control plane has the EDM configured, the data plane processes requests to/from the clients 502. The cloud nodes 102 can implement the DLP processing engine 504 or communicate to another server implementing the DLP processing engine 504. After an EDM event is detected by the DLP processing engine 504, the associated data can be quarantined, and administrators can be notified.

EDM Control Plane Configuration—ADP Virtual Appliance

The ADP virtual appliance 510 can include various Virtual Machine (VM) packages for each customer (enterprise, etc.). The ADP virtual appliance 510 can include a browser-based UI, command line tool, etc. The customer, e.g., IT administrator, can be authenticated in the ADP virtual appliance 510 via a client certificate. The purpose of the ADP virtual appliance 510 is to allow the customer to upload, update, etc. a data set for EDM (the data sets 512) and to provide the company configuration 518. The ADP virtual appliance 510 can be implemented within the company's network, and an objective of the data sets 512 is to be obscured, so the associated records are unreadable by the cloud-based system 100 or in transit. Specifically, the structured data sources 400 are hashed using a one-way hash to transform the sensitive data into a digest, and the associated records are provided as the hash table for look up in the EDM system 500. That is, the data sets 512 from the ADP virtual appliance 510 are look up tables. Also, the ADP virtual appliance 510 can be auto-updated with the latest application software distributed from the cloud feed node. Further, all communications can be secure between the various devices, such as via Secure Sockets Layer (SSL) with certificate-based authentication.

To add a new schema, a user can specify a source file for the ADP virtual appliance 510. The source file is a structured data source 400, i.e., contains records which can be kept in columns, rows, etc. For example, the source file can be a CSV file (Comma Separated Values) or the like. From the source file, the ADP virtual appliance 510 will parse the headers (row 1), and the user can select columns for a new schema and select a column key. The ADP virtual appliance 510 can upload the schema information to the central authority 106 via a Representational state transfer (REST) API.

Once the schema is determined, the ADP virtual appliance 510 can include an application to generate the hashes file on the source file based thereon. The application can preprocess the source file to remove extraneous spaces, convert hyphenated numbers to numeric strings, etc. The application can then generate a table of hashes of all objects in the source file (e.g., CSV file), calculate a row hash for each row, and sort the table based on the row hash value. The table can be stored as a file, e.g. "orgid_schema-name.md5" and then uploaded to the central feed distribution server 514. In an exemplary embodiment, the hashes can be based on MD5.

Figure 6:
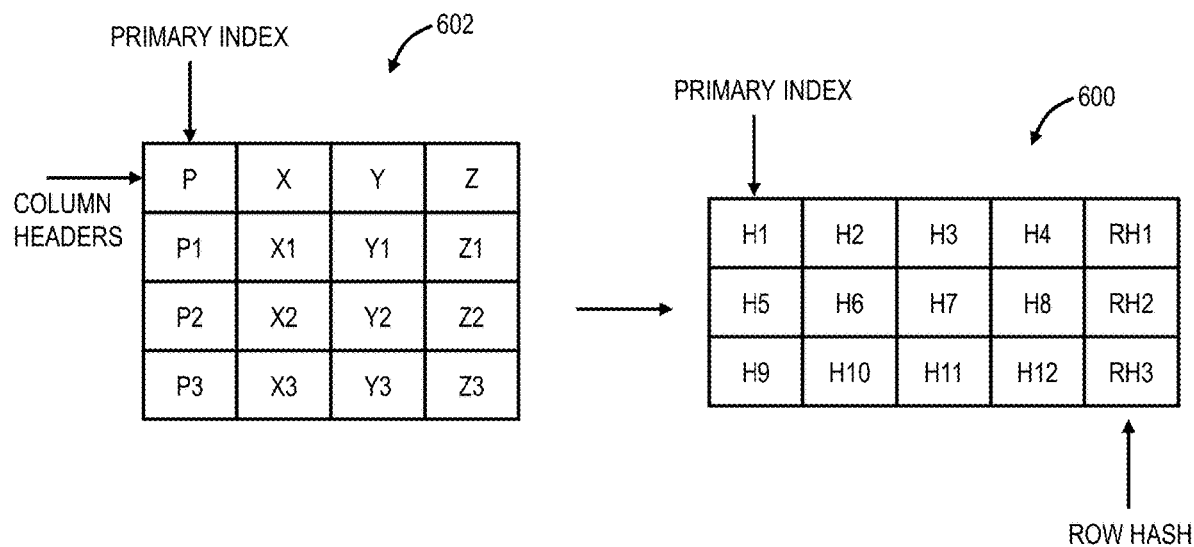
FIG. 6 is a block diagram of an example of creating a hash file from an exemplary source file.

Referring to FIG. 6, in an exemplary embodiment, a block diagram illustrates an example of creating a hash file 600 from an exemplary source file 602. The source file 602 has a header row of P, X, Y, Z and the first column, P, is the primary index. The source file 602 further contains data records in the rows, e.g., P1, X1, Y1, Z1, etc. The hash file 600 contains a hash of each data record, e.g., H1 for P1, H2 for X1, H3 for Y1, H4 for Z1, and RH1 for a row hash of the row, etc.

When the customer wants to update the source file for a schema, the ADP virtual appliance 510 can invoke its application to generate the new hashes and a delta file. This process includes generating a new hash file per the updated source file. Next, using the row hashes, the application can determine deltas, i.e., rows added "+" and rows deleted "−" as compared to the previous hash file 600. The deltas can be stored in a file, e.g. "orgid_schema_version.delta," and uploaded to the central feed distribution server 514 where the updated hash file 600 replaces the previous version. Specifically, when the customer has updates to the data sets, the system is able to find the delta between the old and new datasets (additions, deletions, updates). Only the tokens (i.e., the delta) are transformed to a hash representation updated to the cloud nodes. The cloud nodes are kept in sync with the latest data set the customer has submitted.

EDM Control Plane Configuration—ADP Virtual Appliance to Cloud Protocol

The ADP virtual appliance 510 can communicate with the central authority 106 via the UI 516 using the REST API. The UI 516 can authenticate the ADP virtual appliance 510 such as using a username/password or the like. The ADP virtual appliance 510 will then use an API Key in every message to interact with the API, such as for subsequent operations—i) add a new schema, ii) list existing schemas, iii) update the source file for existing schema, and iv) delete existing schemas. To list existing schemas, the API can return JSON (JavaScript Object Notation) data containing information for each schema. To add a new schema, the AP will accept the schema info for a data set 512 from the ADP virtual appliance 510. The schema information can include, for example:

---

Schema name (must be unique for an organization) (Max length 127)
Number of columns (Max columns 12)
Selected column names (Max length 63)
Key columns selected (Max 4)
Token type information of key columns
Minimum token length of key columns (range 4-24)

---

Once the schema information is posted to the central authority 106, the hash data set can be uploaded to the central feed distribution server 514.

To update existing schema, the existing schema is selected, and a new source file is provided for this schema. This may be performed as additional information is added to the structured data source. To delete existing schema, the ADP virtual appliance 510 will check via the API if there are any policies bound to this schema. If there are no policies, the schema can be deleted. If there are policies, the ADP virtual appliance 510 can communicate to the central feed distribution server 514 to delete the hash file 600 associated with this schema.

The following tables can be used to handle EDM information in an exemplary embodiment:

EDM_schema_metadata

| | | |
|---|---|---|
| Sch_ID | Integer | Not null |
| Org_ID | Integer | Not null |
| EDM_client_ID | Integer | Not null |
| Sch_version | Text | Not null; default "1.0" |
| Tot_columns | Integer | Not null |
| File_name | Text | Not null |
| Flag | Integer | Default 0 |
| Mod_time | Integer | Not null |
| Mod_UID | Integer | Not null |
| Create_time | Integer | Not null |
| Create_UID | Integer | Not null |
| Sch_revision | Integer | Not null; default 1 |
| Sch_upload_status | Integer | Not null; default 0 |
| Sch_orig_filename | Text | Not null |

EDM_schema_details

| | | |
|---|---|---|
| Sch_ID | Integer | Not null |
| Org_ID | Integer | Not null |
| Col_name | Text | Not null |
| Col_type | Integer | Not null |
| Is_primary | Boolean | Default F |
| Col_order_cust_upload | Integer | Not null |
| Mod_time | Integer | Not null |
| Mod_UID | Integer | Not null |
| Col_order_hash_file | Integer | Not null |

EDM_schema_dictionary_mapping

| | | |
|---|---|---|
| Sch_ID | Integer | Not null |
| Org_ID | Integer | Not null |
| Mapping_order | Integer | Not null |
| Primary_bitmap | Integer | Not null |
| Primary_coltype_bitmap | BigInt | Not null |
| Sec_bitmap | Integer | Not null |
| Sec_coltype_bitmap | BigInt | Not null |
| Action | Integer | Not null |
| Match_on | Integer | Not null |

PRIMARY_KEY(sche_id, dict_id, mapping_order, primary_bitmap, sec_bitmap)

---

```
MODULE_HEADER
    (module_id, module_len)
--------------------------------------------------------------------------
struct dlp_company_config   Meta-data about the following dlp
config.
-------------------Dlp dictionary info for EDM----------------------------
            ^
            ^
            |
            |
    struct template[struct dlp_company_config.num_edm_schemas]
    struct template_dict[struct dlp_company_config.num_edm_schemas_in_dict]
            |
            |
            V
            V
------------------Dlp dictionary info for phrases and patterns--------------
            ^
            ^
            |
            |
    struct pp_dict[struct dlp_company_config.num_dicts]
    struct dlp engine[struct dlp_company_config.num_engines]
            |
            |
            V
            V
--------------------------------------------------------------------------
END_OF_DLP_MODULE
--------------------------------------------------------------------------
```

EDM Control Plane Configuration—Central Feed Distribution Server

The central feed distribution server 514 stores the hash files 600 for all schemas for all companies in its file system. For example, if the cloud-based system 100 is a multi-tenant security system, this can include the hash files 600 for all customers. The central feed distribution server 514 also generates the initial index lookup for all schemas of a company. The hash files 600 and index lookup files for each Org_ID can be organized in one directory and distributed together as a package to all of the DLP processing engines 504. Again, these hash files 600 do not contain the actual PII data, but hash representations. Thus, there is no security risk.

Figure 7:
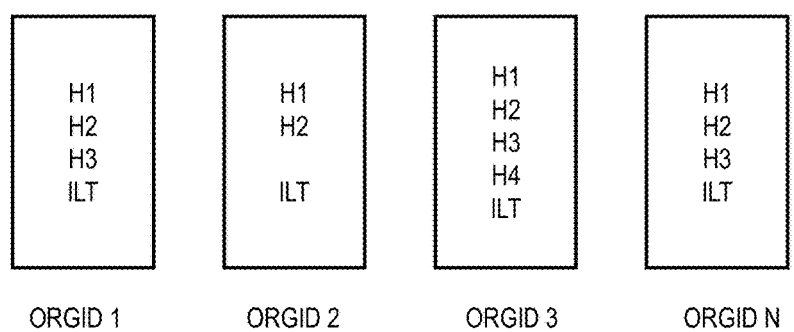
FIG. 7 is a diagram of hash files and index lookup tables (ILT) for different organizations.
Figure 8:
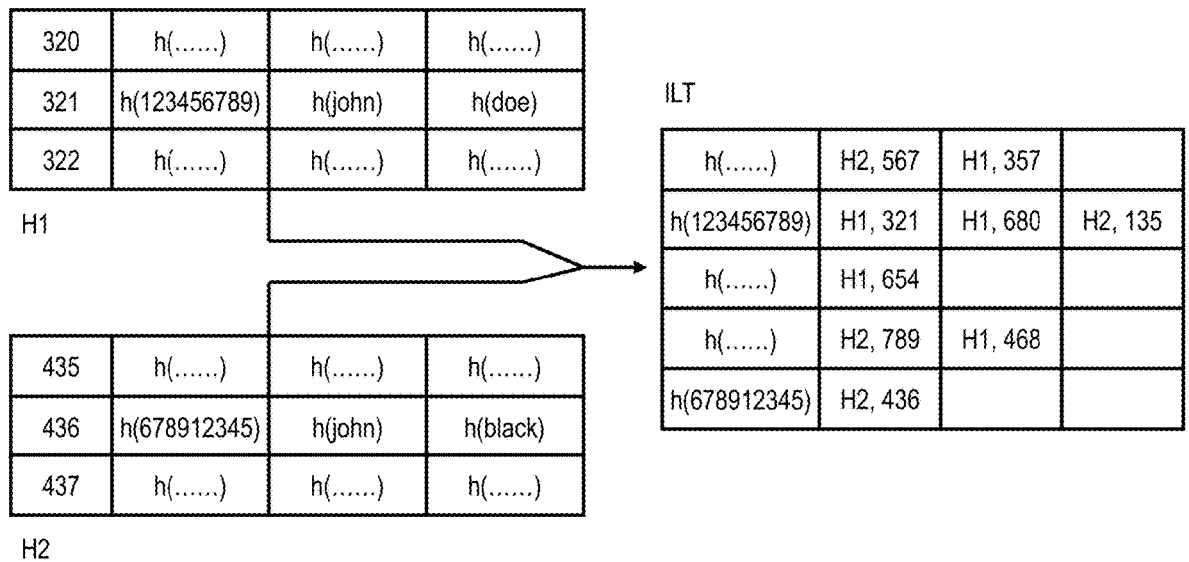
FIG. 8 is a diagram of the memory mapping of the hash files H1, H2 to the ILT.

Referring to FIG. 7, in an exemplary embodiment, a diagram illustrates hash files and index lookup tables (ILT) for different organizations (Orgid 1, Orgid 2, etc.). The central feed distribution server 514 and the DLP processing engines 504 can use a common library to generate the index lookup table and to do a key MD5 lookup. To do an MD5 lookup, the full index lookup file and the hash files 600 will be memory mapped. The index lookup file contains a hash map for the primary keys from all schemas as an index, and the value is the hashes file ID and the row index for that key. Referring to FIG. 8, in an exemplary embodiment, a diagram illustrates the memory mapping of the hash files H1, H2 to the ILT.

Data Plane—Cloud Node and DLP Processing Engine

Figure 9:
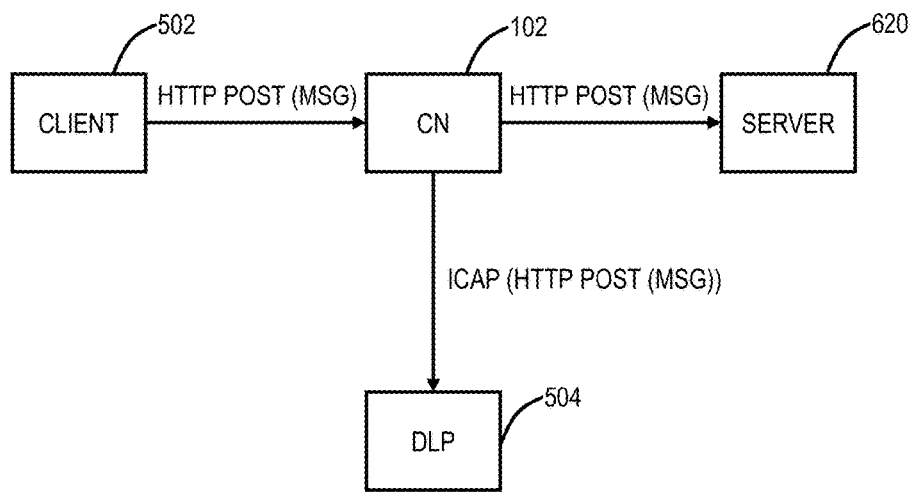
FIG. 9 is a network diagram of a portion of the EDM system of FIG. 5 for interaction between the various nodes in the data plane.

Referring to FIG. 9, in an exemplary embodiment, a network diagram illustrates a portion of the EDM system 500 for interaction between the various nodes in the data plane. The cloud node 102 is configured to perform inline monitoring of the client 502. For example, this can include Zscaler Internet Access (ZIA) available from Zscaler, Inc. Through the inline monitoring, the cloud node 102 receives a POST/PUT request. The cloud node 102 checks if the company configuration 518 for the client 502 has a DLP EDM policy and the DLP processing engine 504 is configured. If so, the cloud node 102 provides the request to the DLP processing engine 504. For delivery from the cloud node 102 to the DLP processing engine 504, the cloud node 102 can wrap the client POST message in an Internet Content Adaptation Protocol (ICAP) message with added header fields for the user, the Org ID, the location ID, and a transaction ID.

The DLP processing engine 504 can treat the POST requests from the cloud node 102 as tunnel requests and the DLP processing engine 504 will fetch the company configuration 518 using the headers in the POST header. The following data structures can be used:

Proposed Structure for EDM Dictionaries.

```
typedef struct edm_schema{
    u16bits      id;
    u08bits      name[MAX_NAME_LEN+1];
}edm_schema_t;
typedef struct edm_template_dict{
    u08bits      dict_id;
    u16bits      schema_id;
    u08bits      mapping_number;
    u16bits      primary_colnum_bitmap;
    u128bits     primary_coltype_bitmap;
    u16bits      sec_colnum_bitmap;
    u128bits     secondary_coltype_bitmap;
    u08bits      sec_matchon;
    u08bits      action;
}edm_template_dict_t;
```

Data Plane—EDM Processing

For inline tokenization, tokenization is breaking up data into words or tokens. The type of token can be determined by the first character of the word and the previous character. Prior to the EDM described herein, DLP tokenization was done roughly with one-way traffic, i.e., it does not look back during the scanning. For data types mixed with letters and digits, the tokenizer scans the phrase part and the number part separately and stitch them together by tracking the matching state. Also, when the DLP engine loads customer configured dictionaries that contain alphanumeric phrases, it breaks them up into word phrase and numeric phrase separately.

However, with the EDM described herein, the DLP processing engine 504 can examine traffic that may contain arbitrary alphanumeric inline data, so the tokenizer must handle more complicated scenarios. For example, when reading a digit followed by a letter, the letter could either denote the end of a number token or the continuation of an alphanumeric token. As a result, the DLP tokenizer needs to be enhanced to look back and find the beginning of an alphanumeric token whenever it reads a letter and a digit adjacent to each other. To achieve this, a set of delimiters and token types are defined as follows. The EDM system can include delimiters for words, numbers, numeric phrases, alphanumeric, and email addresses. Each delimiter provides a boundary for a token of that type.

| | |
|---|---|
| Word delimiters | everything except (A-Z, a-z, underscore, hyphen) |
| Number delimiters | everything except (0-9, space, hyphen) |
| Numeric phrase delimiters | everything except (0-9, hyphen) |
| Alphanumeric delimiters | everything except (A-Z, a-z, 0-9, underscore, hyphen) |
| Email address delimiters | everything except (A-Z, a-z, 0-9, and special characters as defined in RFC822 and enforced by EDM client as well, i.e.: !#$%&'*+-./=?^_`{\|}~) |

Token Types

Similar to the delimiter types, the token types can be words, numbers, numeric phrases, alphanumeric, and email addresses. For a word token, the first character is an alphabet, and the previous character is a word delimiter. To perform tokenization of a word token, the DLP processing engine 504 collects all characters into a token buffer until a word delimiter is read. For normalization, the DLP processing engine 504 can remove any characters other than letters and convert all letters to lowercase. Note, the hash files 600 can also be created based on the normalization, i.e., the normalization is performed in a similar manner on the source files prior to creating the hashes.

For a number token, the first character is a digit, and the previous character is a number delimiter. To perform tokenization of a number token, the DLP processing engine 504 collects the digits into a token buffer until a number delimiter is read. For normalization, the DLP processing engine 504 can remove any characters other than the digits (e.g., hyphens, etc.).

Alphanumeric tokens can fall into two cases. First, if the token starts with a digit and the previous character is a letter. The DLP processing engine 504 looks back until a word delimiter is found, then collects from this character forward until an alphanumeric delimiter is read. Second, if the token starts with a letter and previous character is a digit. The DLP processing engine 504 looks back until a numeric phrase delimiter is found, then collects from this character forward until an alphanumeric delimiter is read. For normalization of the alphanumeric tokens, the DLP processing engine 504 removes any characters other than letter and digit and converts to lowercase.

For an email address token, the first letter is the at sign "@." For tokenization, the processing engine 504 looks back until an email address delimiter is found, then collects from this character forward until an email address delimiter is read.

Figure 10:
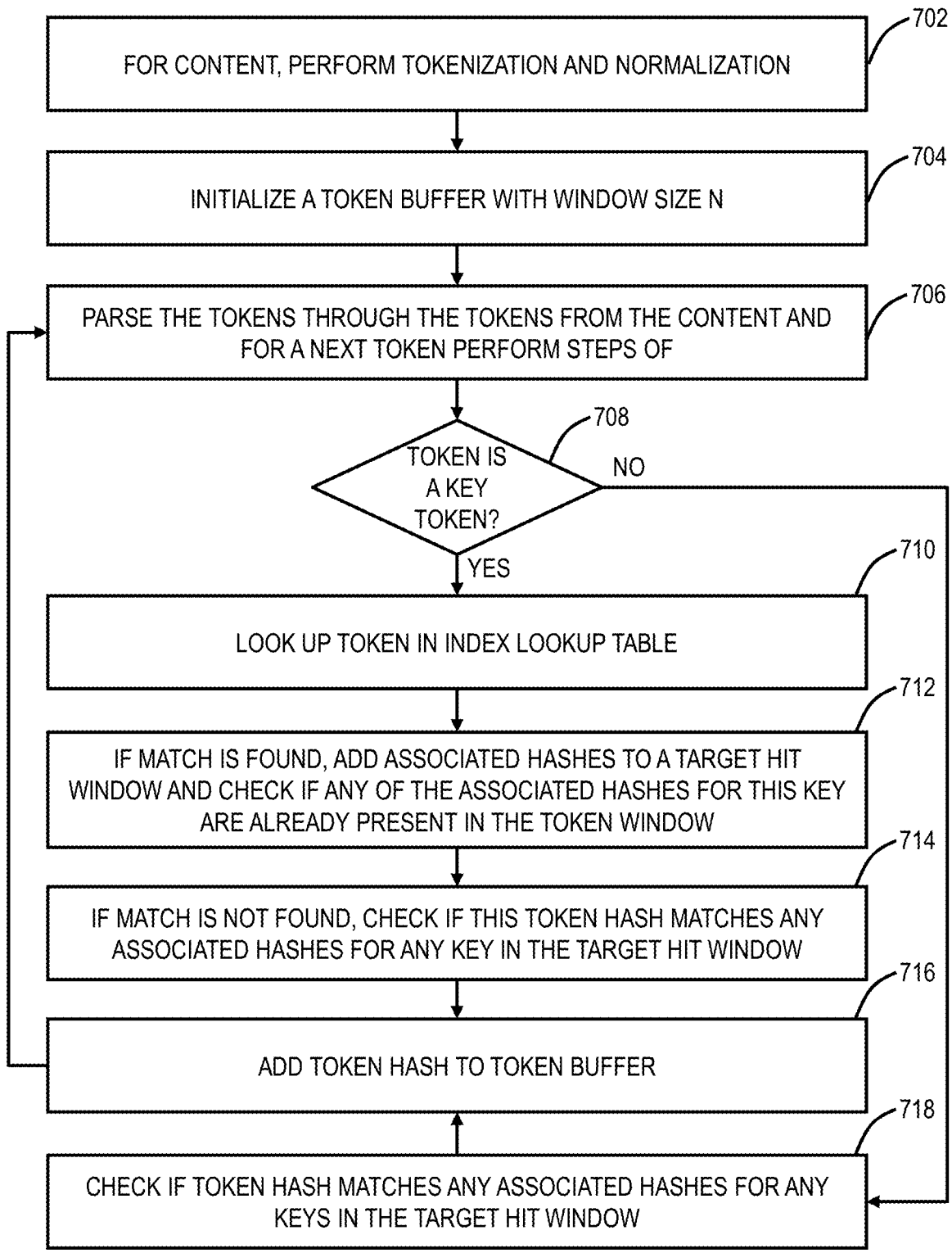
FIG. 10 is a flowchart of a method for exact match lookup.

For example, for the following inline data:
ab-cd4929 3813-3266 4295xyz foo.bar@gmail.com"
The EDM tokens are:
abcd, abcd4929, 492938 332664295, 4295 xyz, xyz, foo, bar, foo.bar@gmail.com, gmail, com On the contrary, the DLP tokens are:
ab, cd, 4929 3813-3266 4295, xyz, foo, bar, gmail, coin An EDM token could be any of those types listed above, whereas a DLP token could only be word or number tokens, Exact Match Lookup Referring to FIG. 10, in an exemplary embodiment, a flowchart illustrates a method 700 for exact match lookup. The method 700 can be implemented through the EDM system 500 and is implemented upon receipt of content. For example, the content can be a data stream, email message, file document (e.g., Word, Excel, etc.), text message, or any other type of content. Again, the content is obtained based on inline monitoring in the cloud-based system 100 by the cloud node 102. Once the content is obtained, tokenization and normalization are performed on the content (step 702). The process of tokenization and normalization is as described herein.

The method 700 includes identifying the company configuration 518, and the data sets 512. This provides the specific EDM data that is searched for in the content. The method 700 includes initializing a token buffer (or token window) with a window size N (e.g., N may be 32 or the like) (step 704). The token buffer can be a circular buffer with a size of N. At this point, the method 700 includes parsing through the tokens from the content and performs the following steps for each token (step 706).

First, the method 700 includes checking if the token is a key token (step 708). The key token is one in the schema that is used for the primary index (e.g., column P in the source file 602). Note, there can be more than one primary index, with the method 700 concurrently looking for the multiple primary indexes and with multiple token windows. This checking can include determining if the token is the same type (word, number, alphanumeric, email address token) as the primary index as defined in the schema. For example, if the primary index is a word token, and the current token being evaluated is a number, etc., then this current token is not a key token.

If the token type is a key token (step 708), the method 700 includes looking up the token hash in the Index Lookup Table (ILT) (FIG. 8). If a match is found, i.e., the current token's hash is in the ILT, then the method 700 includes adding the associated hashes to a target hit window (MT) and checking the rest of the token buffer to see if any associated hashes for this key are already present in the token window (step 712). For example, if the current token is found, e.g., the token is H1 (from FIG. 6), the token window is checked to see if H2, H3, or H4 are also present.

If a match is not found, the method 700 includes checking if this token hash matches any associated hashes for any key in the target hit window (step 714). The method 700 then includes adding the token hash for the current token to the token buffer (step 716).

If the token is not a key token type (step 708), the method 700 includes checking if the token hash matches any associated hashes for any keys in the target hit window (step 718). If the token is a number token and the key token type is a word token, this step includes checking if the number token is associated with any record for any of the key tokens in the target hit window. For example, assume the token is H2 (from FIG. 6), this step includes checking the target hit window for H1 (from FIG. 6). The method 700 then includes adding the token hash for the current token to the token buffer (step 716).

After step 716, the method 700 returns to the next token (step 706). Once all tokens are evaluated, the method 700 includes a number of tokens that match a specific record associated with a primary key. Based on the number of matching tokens for a specific record, the EDM system 500 can take action, such as block, notify, and/or quarantine. In some embodiments, the number of matching tokens is all of the tokens in a specific record. In other embodiments, the number may be less than all of the tokens, such as user configurable.

Figure 11:
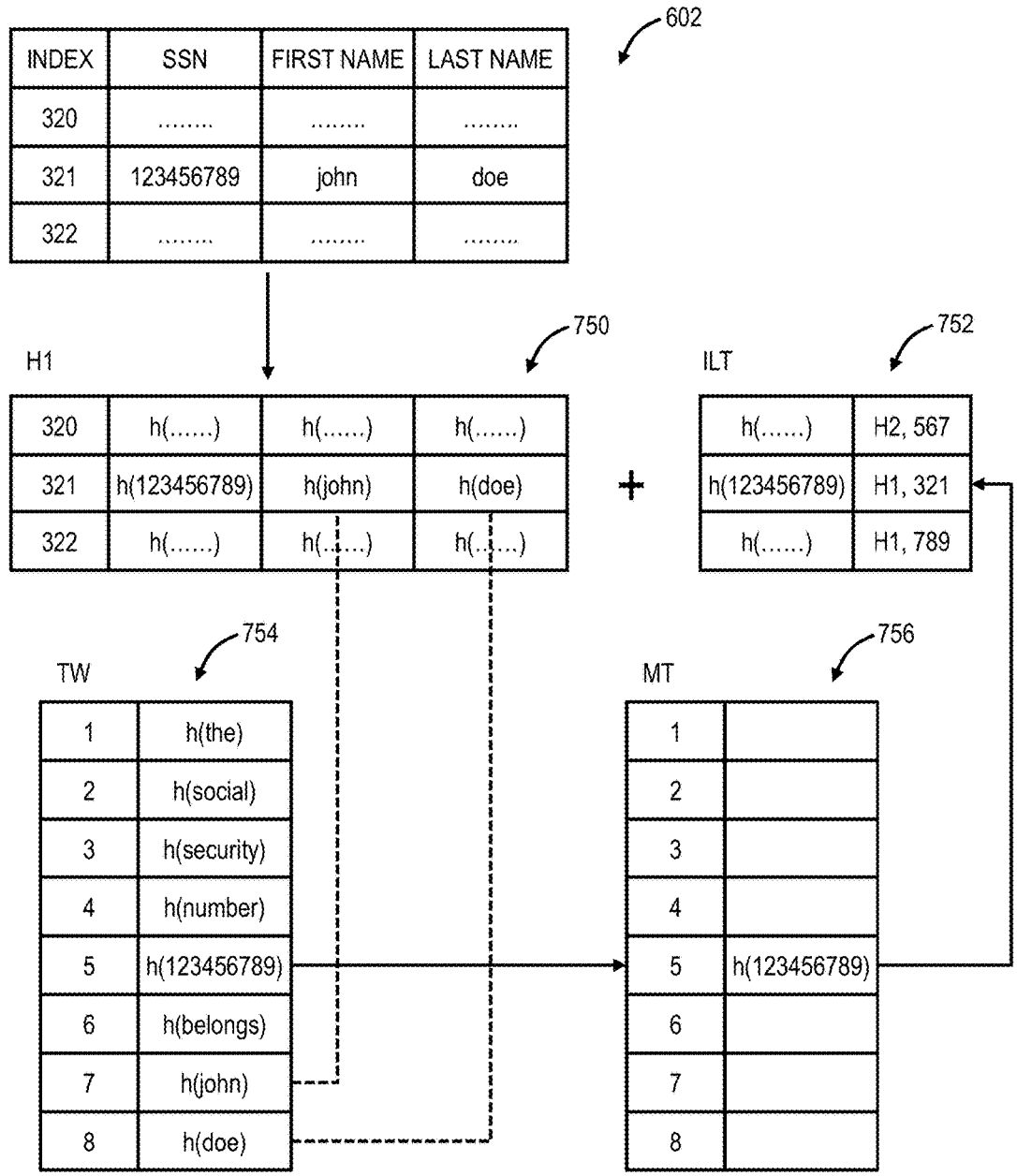
FIG. 11 is a diagram of an example of the method of FIG. 10.

Referring to FIG. 11, in an exemplary embodiment, a diagram illustrates an example of the method 700. Assume for this example the window size N=8 and the example content is "The social security number 123456789 belongs to John Doe." The source file 602 is shown which is hashed to a table 750 which an ILT 752 with the primary key based on Social Security Number (SSN). A token window 754 is filled with the tokens—the, social, security, number, 123456789, belongs, john, doe. Note, all of the tokens are word tokens except 123456789 which is a number token and the primary key token. The token window 754 is filled with the tokens until the primary key token 123456789 is seen and this is added to a target hit window 756. Once the final tokens of john and doe are parsed, it is determined they belong to the record associated with the primary key token 123456789. Thus, there are 3 token matches in this example.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of data matching for identifying data content in a cloud-based system, the method comprising:
    implementing an Advanced Data Protection (ADP) virtual appliance on a customer network, the customer network being a customer of the cloud-based security system;
    providing a browser-based User Interface (UI) adapted for allowing users to upload data sources and company configurations;
    authenticating a user associated with the customer network at the virtual appliance;
    receiving, at the virtual appliance, a data source for the data matching uploaded by the user via the browser-based UI, wherein the data source comprises customer specific sensitive data;
    hashing the data source with a one-way hash to transform the customer specific sensitive data into a digest, such that the customer specific sensitive data is unreadable by the cloud-based system;
    distributing the digest to a central authority of the cloud-based system, wherein the central authority distributes the digest to nodes of the cloud-based system for performing monitoring of content between a client of the customer and an external network by detecting a presence of the customer specific sensitive data via the data matching using the digest;
    receiving an updated data source via the browser-based UI;
    determining one or more deltas between the data source and the updated data source, wherein the one or more deltas include any of additions, deletions, and updates; and
    distributing the one or more deltas to the central authority of the cloud-based system, wherein the central authority distributes the deltas to the nodes of the cloud-based system.

2. The method of claim 1, further comprising:
    receiving, at the virtual appliance, a company configuration by the user via the browser-based UI; and
    providing the company configuration to the central authority of the cloud-based system, wherein the company configuration includes a policy for the customer.

3. The method of claim 1, wherein the cloud-based system is a multi-tenant system supporting a plurality of customers comprising the customer.

4. The method of claim 1, wherein transforming the customer specific sensitive data into the digest comprises generating a table of hashes of all objects in the data source.

5. The method of claim 4, wherein the appliance parses headers and receives columns selected by the user for a schema used for generating the table of hashes of all of the objects, and wherein the schema is provided to the central authority for the data matching.

6. The method of claim 5, wherein the appliance preprocesses the data source to at least one of remove extraneous spaces and convert hyphenated numbers to numeric strings.

7. An Advanced Data Protection (ADP) appliance operated by a customer of a cloud-based system, the ADP appliance comprising:
    a network interface;
    a processor communicatively coupled to the network interface; and
    memory storing instructions that, when executed, cause the processor to:
        provide a browser-based User Interface (UI) adapted for allowing users to upload data sources and company configurations;
        authenticate a user associated with the customer network;
        receive a data source for data matching uploaded by the user via the browser-based UI, wherein the data source comprises customer specific sensitive data;
        hash the data source with a one-way hash to transform the customer specific sensitive data into a digest, such that the customer specific sensitive data is unreadable by the cloud-based system;
        distribute the digest to a central authority of the cloud-based system, wherein the central authority distributes the digest to nodes of the cloud-based system for performing monitoring of content between a client of the customer and an external network by detecting a presence of the customer specific sensitive data via the data matching using the digest;
        receive an updated data source via the browser-based UI;
        determine one or more deltas between the data source and the updated data source, wherein the one or more deltas include any of additions, deletions, and updates; and
        distribute the one or more deltas to the central authority of the cloud-based system, wherein the central authority distributes the deltas to the nodes of the cloud-based system.

8. The ADP appliance of claim 7, wherein the ADP appliance is under the customer's control.

9. The ADP appliance of claim 7, wherein the memory storing instructions that, when executed, further cause the processor to:
    receive, at the virtual appliance, a company configuration by the user via the browse-based UI; and
    provide the customer company configuration to the central authority of the cloud-based system, wherein the company configuration includes a policy for the customer.

10. The ADP appliance of claim 7, wherein the cloud-based system is a multi-tenant system supporting a plurality of customers comprising the customer.

11. The ADP appliance of claim 7, wherein transforming the customer specific sensitive data into the digest comprises generating a table of hashes of all objects in the data source.

12. The ADP appliance of claim 11, wherein the memory storing instructions that, when executed, further cause the processor to parse headers and receive columns selected by the user for a schema used for generating the table of hashes of all of the objects, and wherein ADP appliance provides the schema to the central authority for the data matching.

13. The ADP appliance of claim 12, wherein the memory storing instructions that, when executed, further cause the processor to preprocesses the data source to at least one of remove extraneous spaces and convert hyphenated numbers to numeric strings.

14. A data matching system for identifying data content in a cloud-based system, comprising:
   a plurality of nodes of the cloud-based system configured to implement the data matching by performing monitoring of content between a client of a customer of the cloud-based system and an external network by detecting a presence of customer specific sensitive data via the data matching using a digest;
   a central authority configured to distribute the digest to the plurality nodes of the cloud-based system; and
   an Advanced Data Protection (ADP) appliance operated by a customer of a cloud-based system, the ADP appliance comprising
      a network interface,
      a processor communicatively coupled to the network interface, and
      memory storing instructions that, when executed, cause the processor to:
         provide a browser-based User Interface (UI) adapted for allowing users to upload data sources and company configurations;
         authenticate a user associated with the customer network;
         receive a data source for the data matching uploaded by the user via the browser-based UI, wherein the data source comprises customer specific sensitive data;
         hash the data source with a one-way hash to transform the customer specific sensitive data into the digest, such that the customer specific sensitive data is unreadable by the cloud-based system;
         distribute the digest to the central authority of the cloud-based system;
         receive an updated data source via the browser-based UI;
         determine one or more deltas between the data source and the updated data source, wherein the one or more deltas include any of additions, deletions, and updates; and
         distribute the one or more deltas to the central authority of the cloud-based system, wherein the central authority distributes the deltas to the nodes of the cloud-based system.

15. The data matching system of claim 14, wherein the ADP appliance is under the customer's control.

16. The data matching system of claim 14, wherein the memory storing instructions that, when executed, further cause the processor to:
   receive, at the virtual appliance, a company configuration by the user via the browser-based UI; and
   provide the company configuration to the central authority of the cloud-based system, wherein the company configuration includes an Exact Data Matching (EDM) policy for the customer.

17. The data matching system of claim 14, wherein the cloud-based system is a multi-tenant system supporting a plurality of customers comprising the customer.

18. The data matching system of claim 14, wherein transforming the customer specific sensitive data into the digest comprises generating a table of hashes of all objects in the data source.

19. The data matching system of claim 18, wherein the memory storing instructions that, when executed, further cause the processor to parse headers and receive columns selected by the user for a schema used for generating the table of hashes of all of the objects, and wherein ADP appliance provides the schema to the central authority for the data matching.

* * * * *